United States Patent
Flanagan et al.

(10) Patent No.: US 10,260,424 B2
(45) Date of Patent: Apr. 16, 2019

(54) TRANSITION DUCT ASSEMBLY WITH LATE INJECTION FEATURES

(71) Applicant: General Electric Company, Schenectady, NY (US)

(72) Inventors: James Scott Flanagan, Simpsonville, SC (US); Kevin Weston McMahan, Greer, SC (US); Jeffrey Scott LeBegue, Greer, SC (US)

(73) Assignee: General Electric Company, Schenectady, NY (US)

( * ) Notice: Subject to any disclaimer, the term of this patent is extended or adjusted under 35 U.S.C. 154(b) by 373 days.

(21) Appl. No.: 15/079,116

(22) Filed: Mar. 24, 2016

(65) Prior Publication Data

US 2017/0276071 A1    Sep. 28, 2017

(51) Int. Cl.
| | |
|---|---|
| F23R 3/34 | (2006.01) |
| F02C 7/22 | (2006.01) |
| F01D 5/02 | (2006.01) |
| F01D 9/02 | (2006.01) |
| F23R 3/46 | (2006.01) |

(52) U.S. Cl.
CPC ............ *F02C 7/222* (2013.01); *F01D 5/02* (2013.01); *F01D 9/023* (2013.01); *F23R 3/46* (2013.01); *F05D 2220/32* (2013.01); *F05D 2270/08* (2013.01); *F23R 3/346* (2013.01)

(58) Field of Classification Search
CPC .... F23R 3/28; F23R 3/286; F23R 3/34; F23R 3/346; F23R 3/46; F02C 7/222
See application file for complete search history.

(56) References Cited

U.S. PATENT DOCUMENTS

| | | |
|---|---|---|
| 4,422,288 A | 12/1983 | Steber |
| 5,077,967 A | 1/1992 | Widener et al. |

(Continued)

FOREIGN PATENT DOCUMENTS

| | | |
|---|---|---|
| EP | 1722069 A1 | 11/2006 |
| EP | 3 184 904 A1 | 6/2017 |

OTHER PUBLICATIONS

Extended European Search Report and Opinion issued in connection with corresponding EP Application No. 7160481.2 dated Jul. 26, 2017.

(Continued)

*Primary Examiner* — Arun Goyal
(74) *Attorney, Agent, or Firm* — Charlotte C. Wilson; Ernest G. Cusick; Frank A. Landgraff

(57) ABSTRACT

A turbomachine includes a plurality of transition ducts disposed in a generally annular array. Each transition duct includes an inlet, an outlet, and a passage defining an interior and extending between the inlet and the outlet and defining a longitudinal axis, a radial axis, and a tangential axis. The outlet of each transition duct is offset from the inlet along the longitudinal axis and the tangential axis. Each transition duct further includes an upstream portion and a downstream portion. The turbomachine further includes a late injection assembly disposed between the upstream portion and the downstream portion of a transition duct and which provides fluid communication for an injection fluid to flow into the interior downstream of the inlet of the transition duct. The late injection assembly includes a late injection ring.

19 Claims, 13 Drawing Sheets

(56) References Cited

U.S. PATENT DOCUMENTS

| | | |
|---|---|---|
| 5,118,120 A | 6/1992 | Drerup et al. |
| 5,249,920 A | 10/1993 | Shepherd et al. |
| 5,414,999 A | 5/1995 | Barnes |
| 5,419,250 A | 5/1995 | Ferguson |
| 5,457,954 A | 10/1995 | Boyd et al. |
| 5,592,820 A | 1/1997 | Alairy et al. |
| 5,761,898 A | 6/1998 | Barnes et al. |
| 5,839,283 A | 11/1998 | Dübbeling |
| 5,934,687 A | 8/1999 | Bagepalli et al. |
| 6,202,420 B1 | 3/2001 | Zarzalis et al. |
| 6,203,025 B1 | 3/2001 | Hayton |
| 6,442,946 B1 | 9/2002 | Kraft et al. |
| 6,471,475 B1 | 10/2002 | Sasu et al. |
| 6,537,023 B1 | 3/2003 | Aksit et al. |
| 6,564,555 B2 | 5/2003 | Rice et al. |
| 6,640,547 B2 | 11/2003 | Leahy, Jr. |
| 6,652,229 B2 | 11/2003 | Lu |
| 6,662,567 B1 | 12/2003 | Jorgensen |
| 7,007,480 B2 | 3/2006 | Nguyen et al. |
| 7,024,863 B2 | 4/2006 | Morenko |
| 7,181,914 B2 | 2/2007 | Pidcock et al. |
| 7,584,620 B2 | 9/2009 | Weaver et al. |
| 7,603,863 B2 | 10/2009 | Widener et al. |
| 7,637,110 B2 | 12/2009 | Czachor et al. |
| 7,721,547 B2 | 5/2010 | Bancalari et al. |
| 7,836,677 B2 | 11/2010 | Bland |
| 7,958,734 B2 | 6/2011 | Paprotna et al. |
| 8,065,881 B2 | 11/2011 | Charron et al. |
| 8,091,365 B2 | 1/2012 | Charron |
| 8,113,003 B2 | 2/2012 | Charron et al. |
| 8,230,688 B2 | 7/2012 | Wilson et al. |
| 8,276,389 B2 | 10/2012 | Charron et al. |
| 8,616,007 B2 | 12/2013 | Charron |
| 8,667,682 B2 | 3/2014 | Lee et al. |
| 8,689,559 B2 * | 4/2014 | Kraemer ............... F02C 7/228 60/733 |
| 8,701,415 B2 * | 4/2014 | Flanagan ............ F01D 11/005 277/312 |
| 8,707,673 B1 | 4/2014 | Flanagan et al. |
| 8,745,986 B2 | 6/2014 | Melton et al. |
| 8,745,987 B2 | 6/2014 | Stoia et al. |
| 8,826,668 B2 | 9/2014 | Lee et al. |
| 8,863,523 B2 | 10/2014 | Chen |
| 8,915,706 B2 | 12/2014 | Stein et al. |
| 8,959,888 B2 | 2/2015 | Laster et al. |
| 8,961,118 B2 | 2/2015 | Charron et al. |
| 8,978,389 B2 | 3/2015 | Wiebe |
| 9,090,954 B2 | 7/2015 | Tassios et al. |
| 9,133,722 B2 * | 9/2015 | LeBegue ................ F01D 9/023 |
| 2009/0145137 A1 | 6/2009 | Rizkalla et al. |
| 2010/0037618 A1 | 2/2010 | Charron et al. |
| 2010/0037619 A1 | 2/2010 | Charron |
| 2010/0115953 A1 | 5/2010 | Davis, Jr. et al. |
| 2011/0056206 A1 | 3/2011 | Wiege |
| 2011/0067402 A1 | 3/2011 | Wiebe et al. |
| 2011/0179803 A1 | 7/2011 | Berry et al. |
| 2011/0259015 A1 | 10/2011 | Johns et al. |
| 2012/0031068 A1 | 2/2012 | Charron |
| 2012/0304653 A1 | 12/2012 | Flanagan et al. |
| 2012/0304665 A1 | 12/2012 | LeBegue |
| 2013/0061570 A1 | 3/2013 | Charron et al. |
| 2013/0081399 A1 | 4/2013 | Wiebe |
| 2013/0081407 A1 | 4/2013 | Wiebe |
| 2013/0139523 A1 | 6/2013 | Myers et al. |
| 2013/0174561 A1 | 7/2013 | Stoia et al. |
| 2013/0180253 A1 | 7/2013 | Stoia et al. |
| 2013/0219853 A1 | 8/2013 | Little et al. |
| 2013/0219921 A1 | 8/2013 | Wiebe et al. |
| 2013/0224007 A1 | 8/2013 | Rodriguez |
| 2013/0224009 A1 | 8/2013 | Little et al. |
| 2013/0239585 A1 | 9/2013 | Morrison |
| 2014/0060000 A1 | 3/2014 | Charron et al. |
| 2014/0060001 A1 | 3/2014 | Beeck |
| 2014/0260272 A1 | 9/2014 | DiCintio et al. |
| 2014/0260274 A1 | 9/2014 | Stoia et al. |
| 2014/0260317 A1 | 9/2014 | Charron et al. |
| 2014/0338304 A1 | 11/2014 | Schilp |
| 2015/0068211 A1 | 3/2015 | Rodriguez |
| 2015/0082794 A1 | 3/2015 | Schilp |
| 2015/0107264 A1 | 4/2015 | Wiebe et al. |
| 2015/0132117 A1 | 5/2015 | Marra et al. |
| 2015/0159877 A1 | 6/2015 | Stoia et al. |
| 2015/0198054 A1 | 7/2015 | Charron et al. |
| 2015/0204243 A1 | 7/2015 | Charron et al. |
| 2016/0047317 A1 | 2/2016 | Willis et al. |

OTHER PUBLICATIONS

Hughes, et al.; U.S. Appl. No. 14/977,993, filed Dec. 22, 2015.
Hughes, et al.; U.S. Appl. No. 14/978,006, filed Dec. 22, 2015.
Hughes, et al.; U.S. Appl. No. 14/978,019, filed Dec. 22, 2015.

* cited by examiner

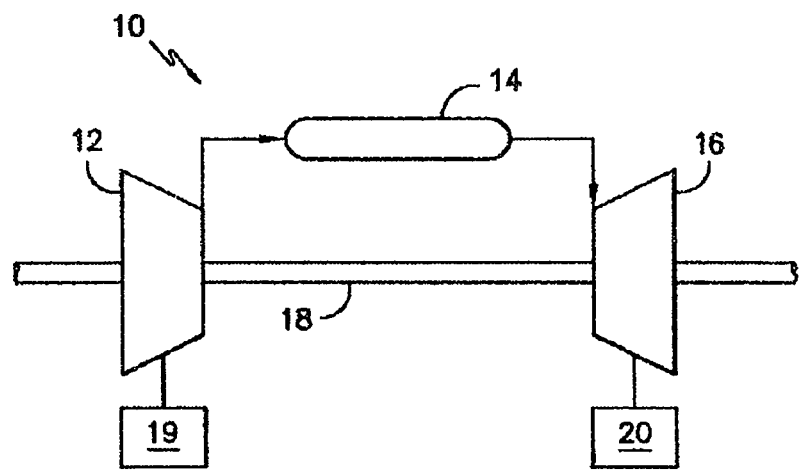
FIG. -1-
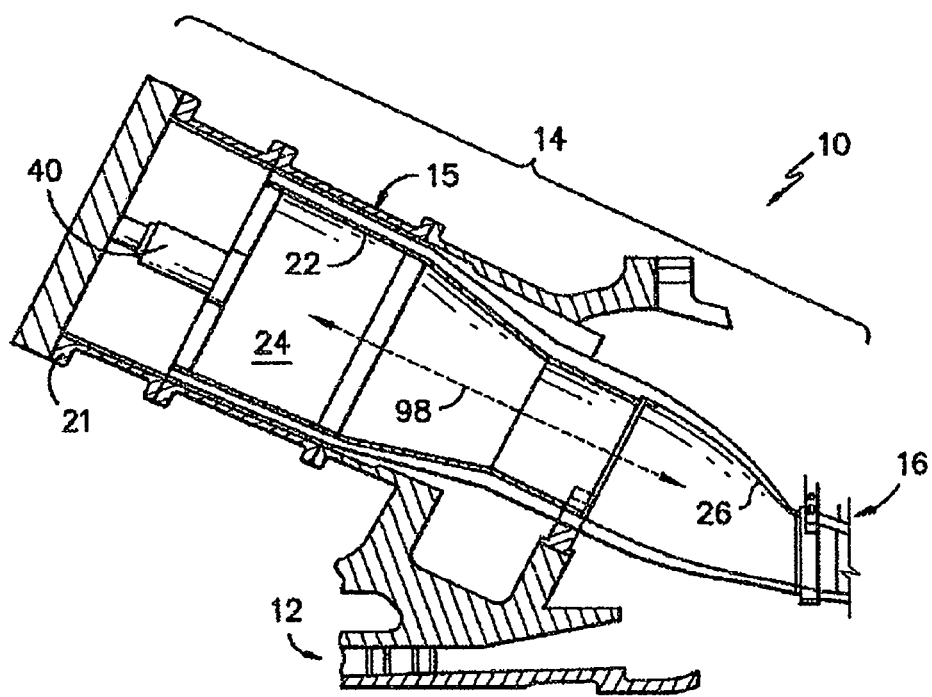
FIG. -2-
— PRIOR ART —

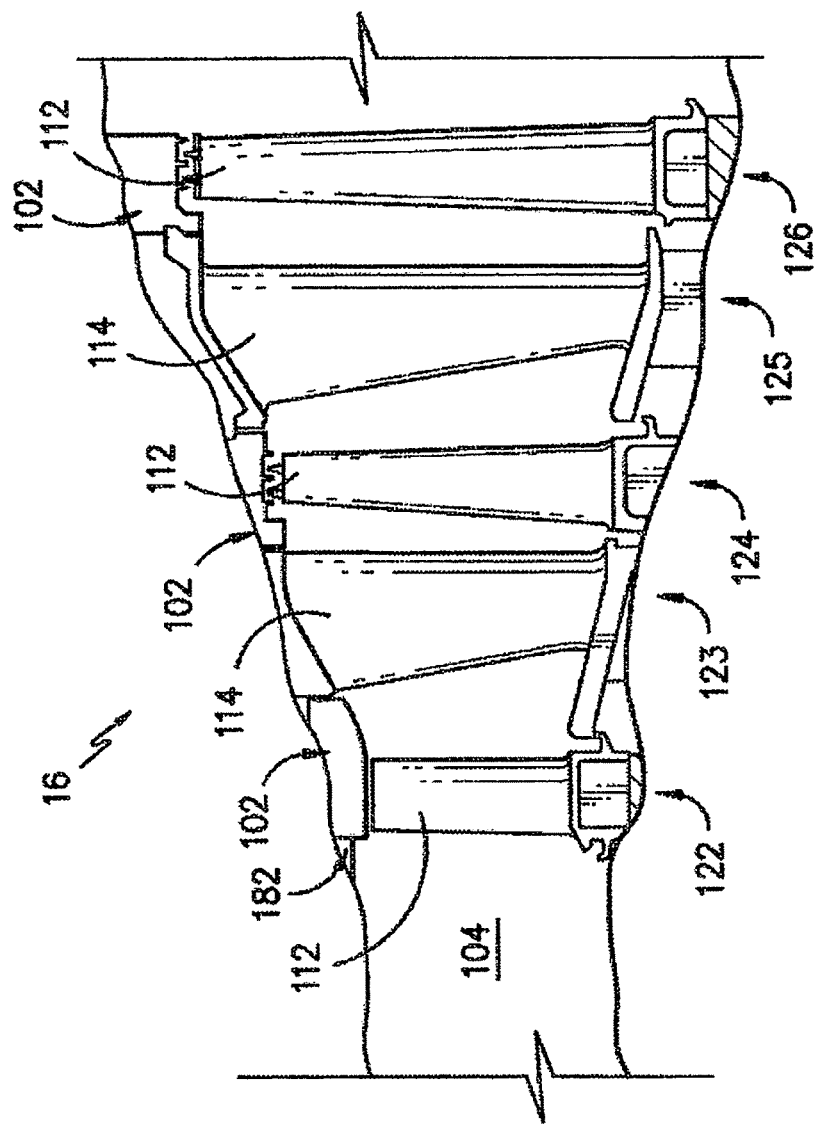
FIG. -3-
—PRIOR ART—

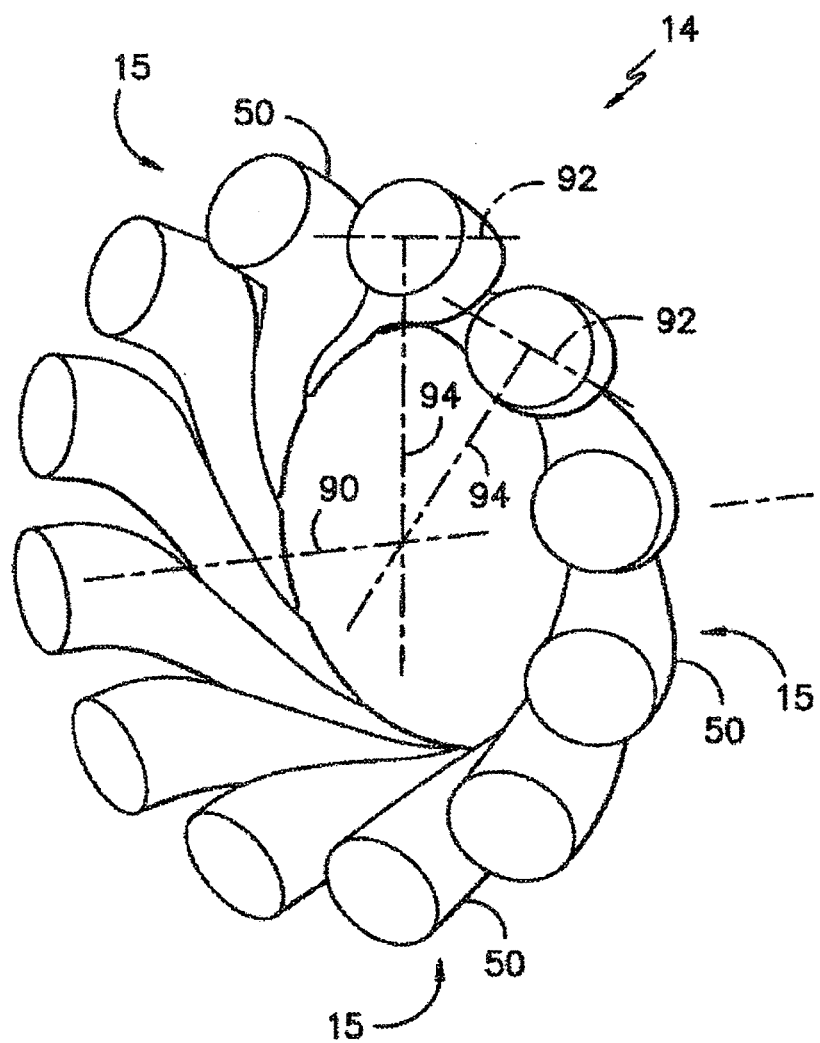
FIG. -4-
— PRIOR ART —

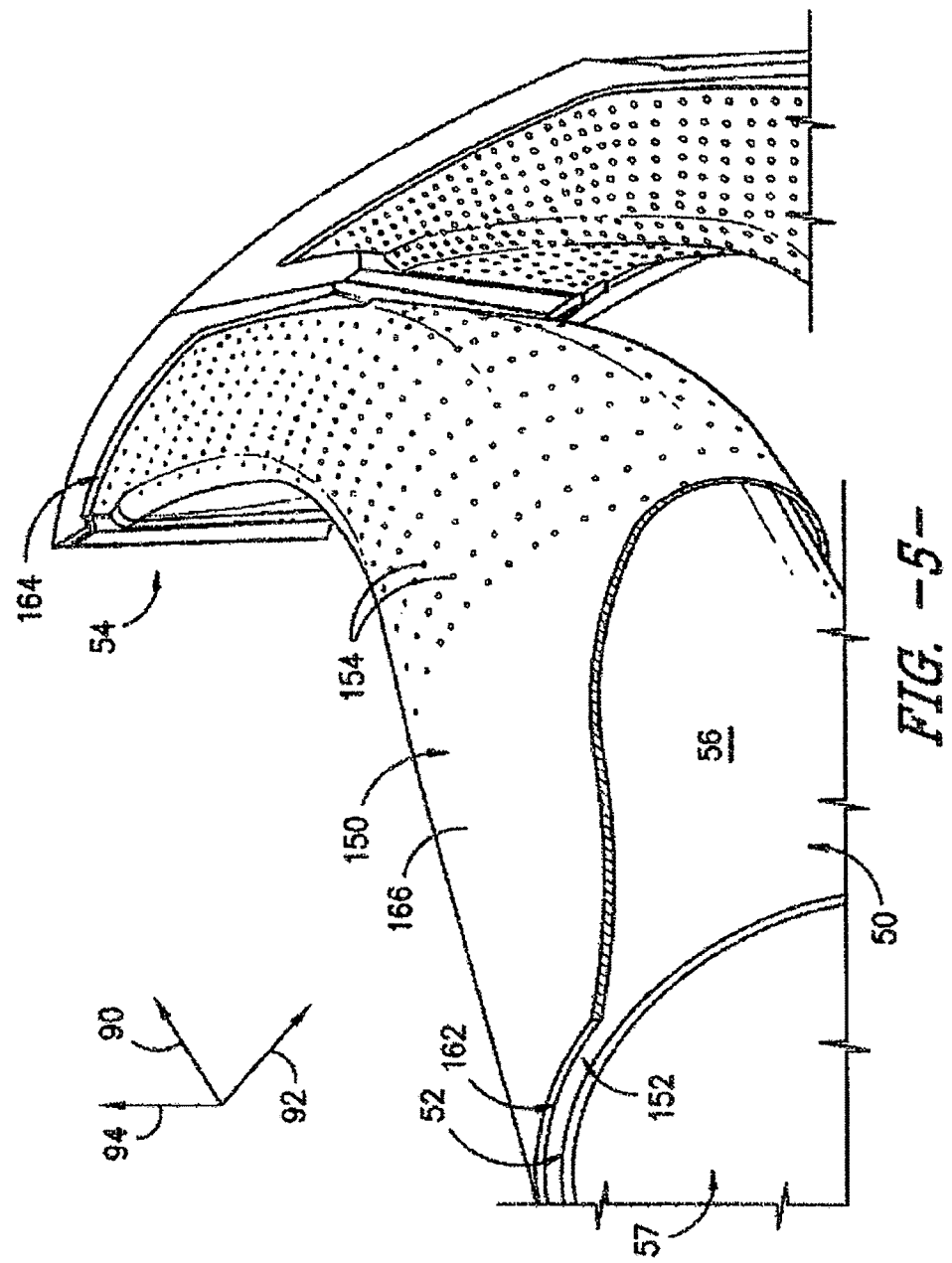
FIG. -5- —PRIOR ART—

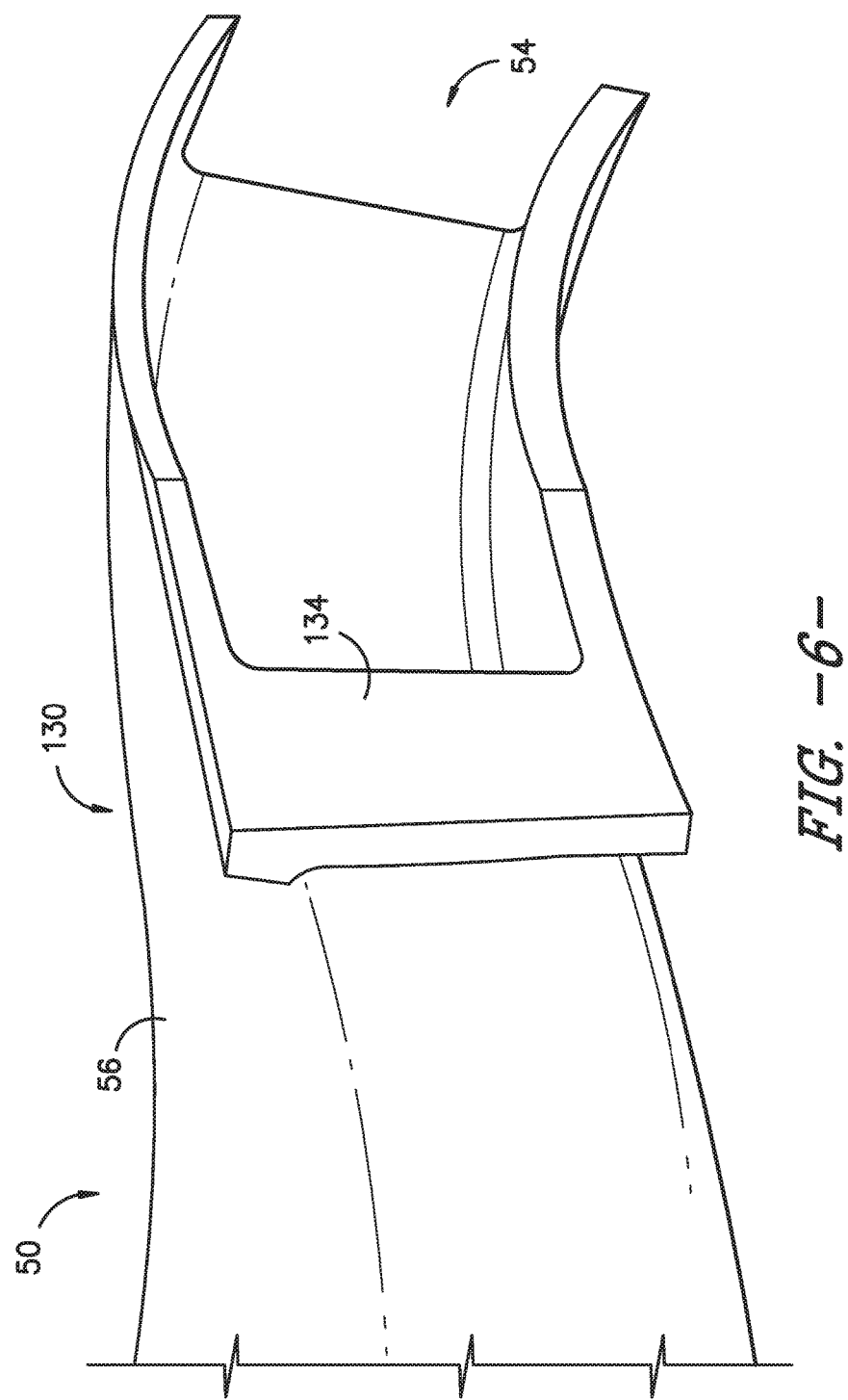
FIG. -6-

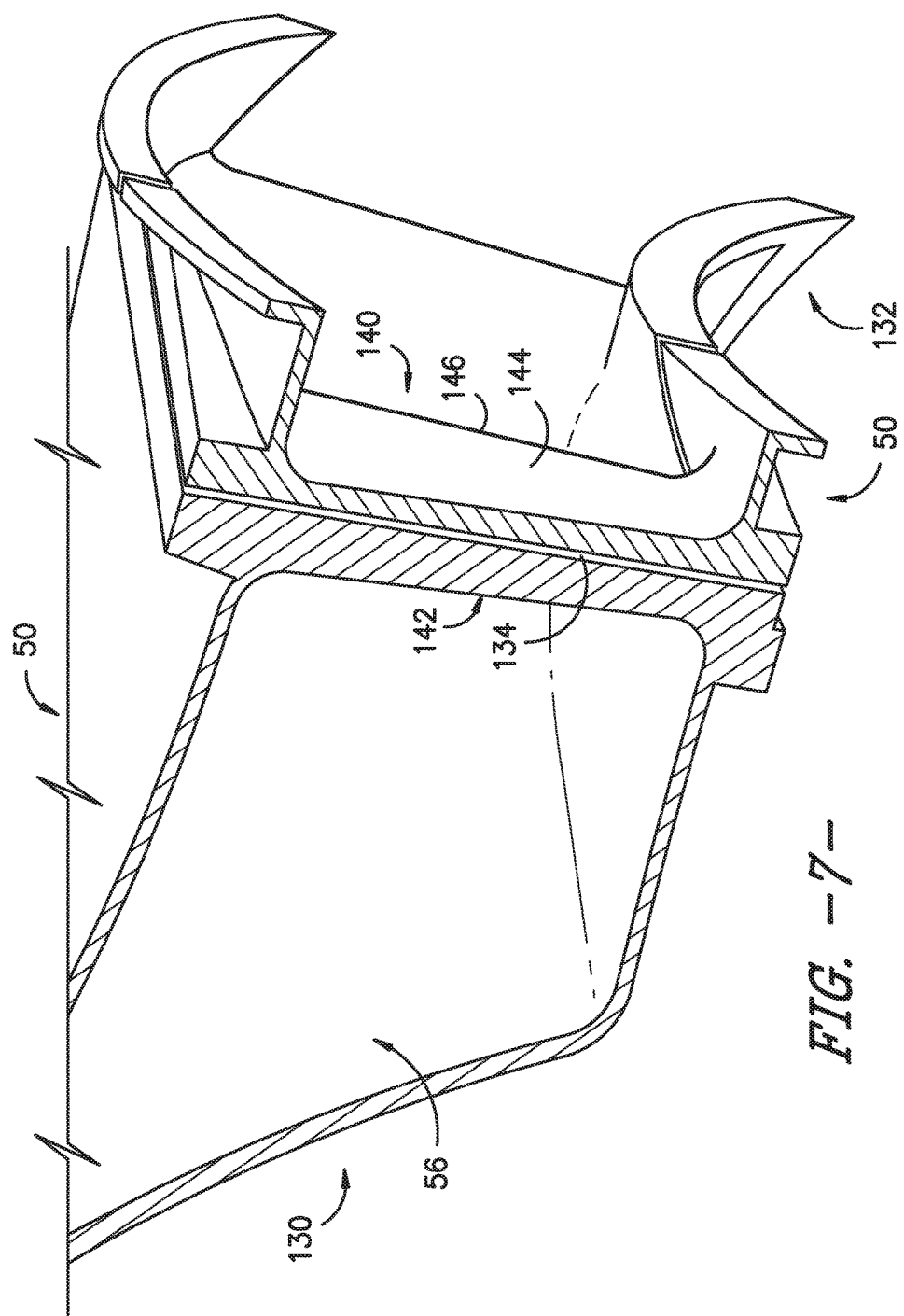
FIG. -7-

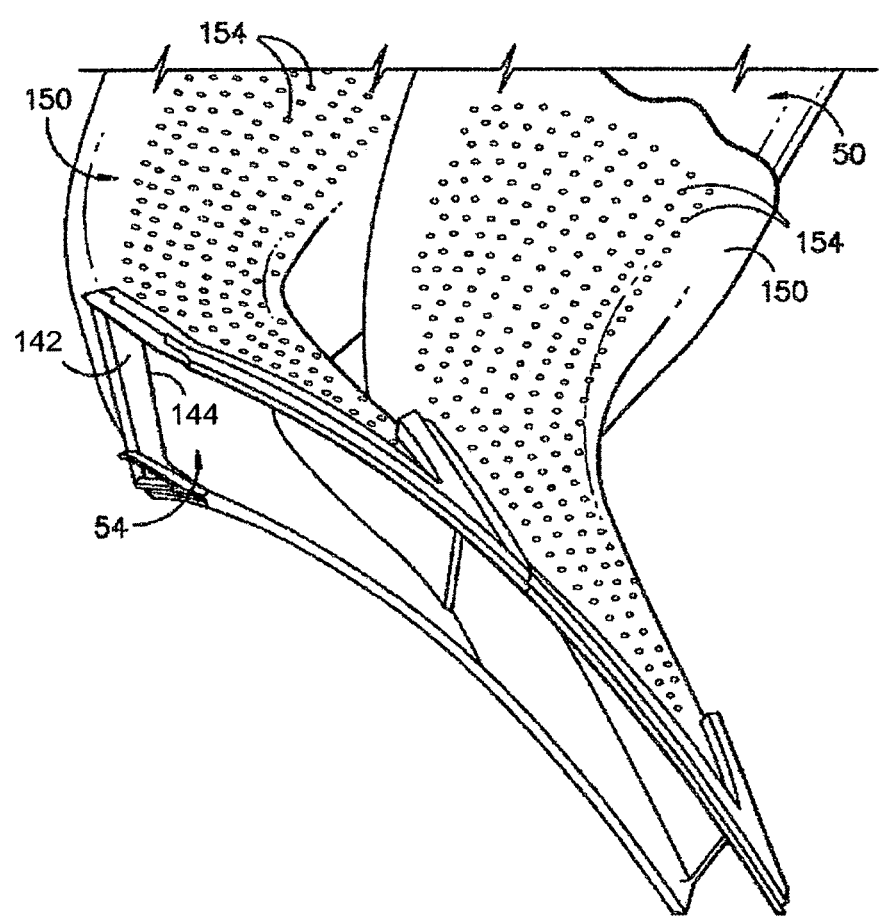
FIG. -8-

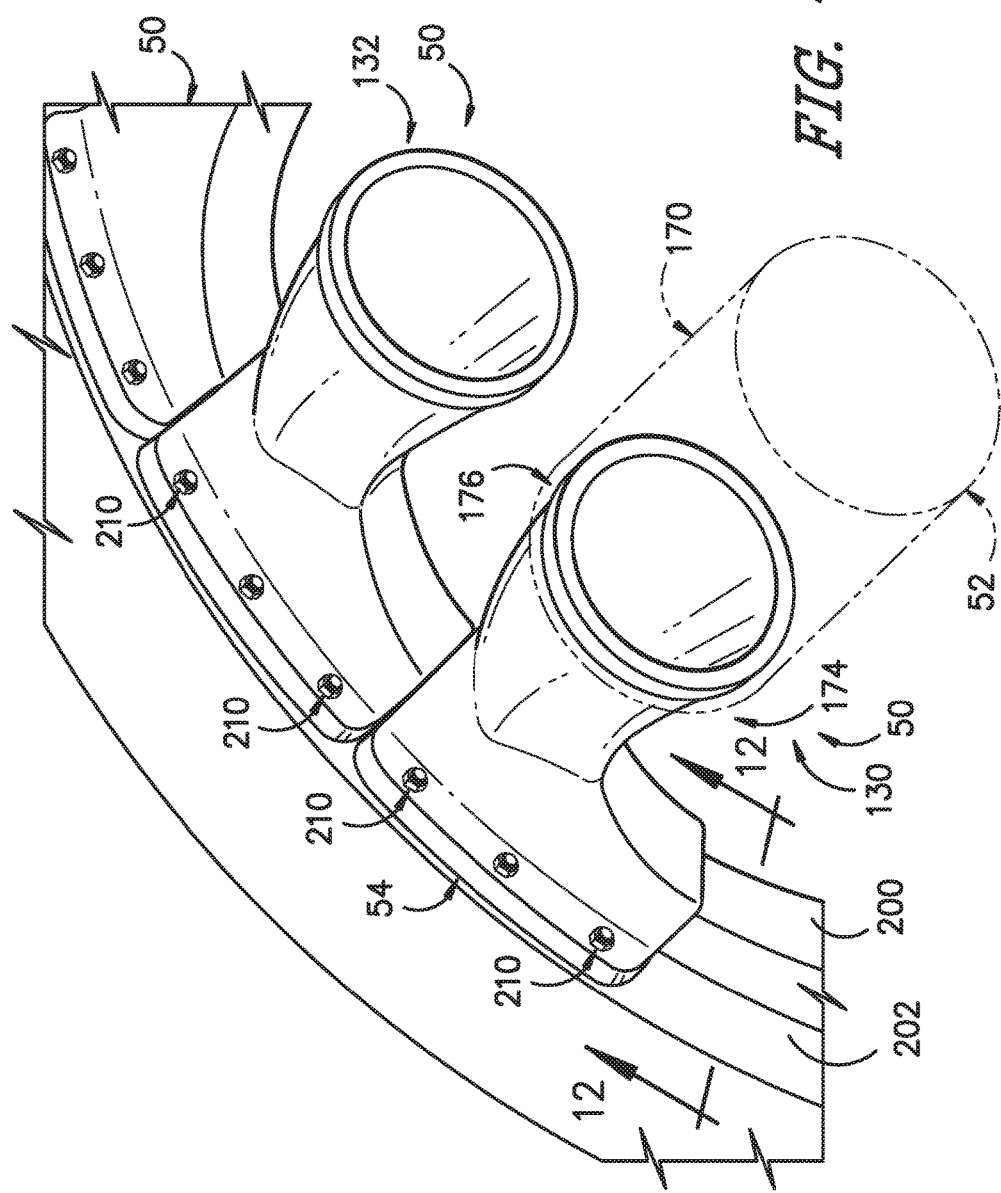

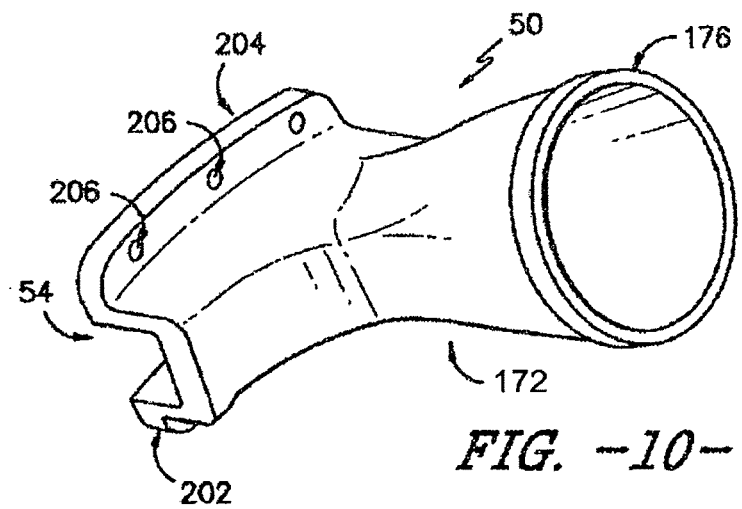
FIG. -10-
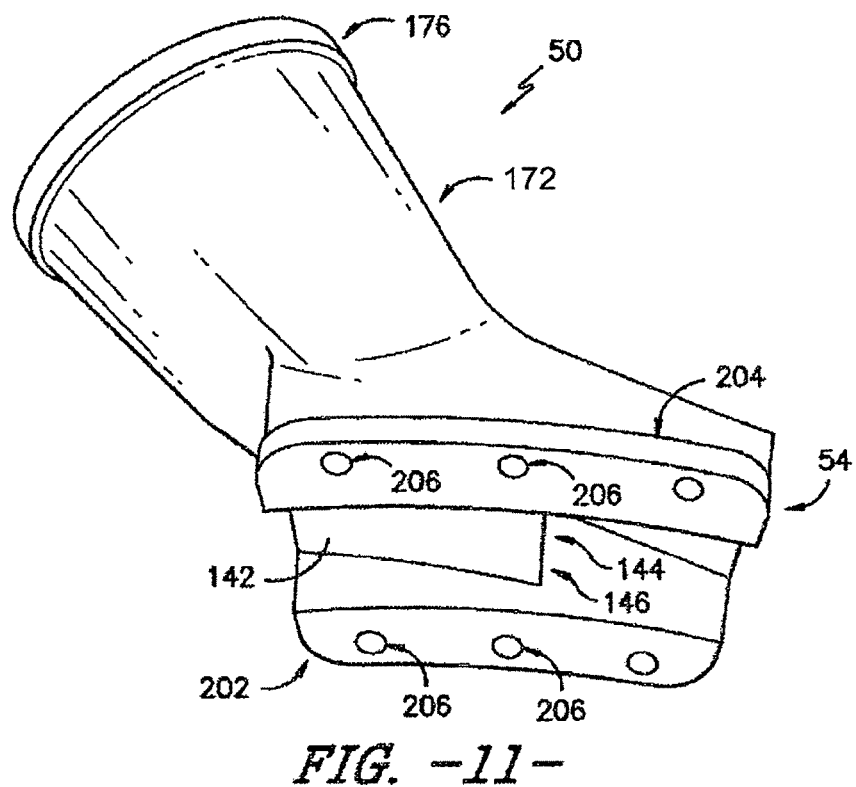
FIG. -11-

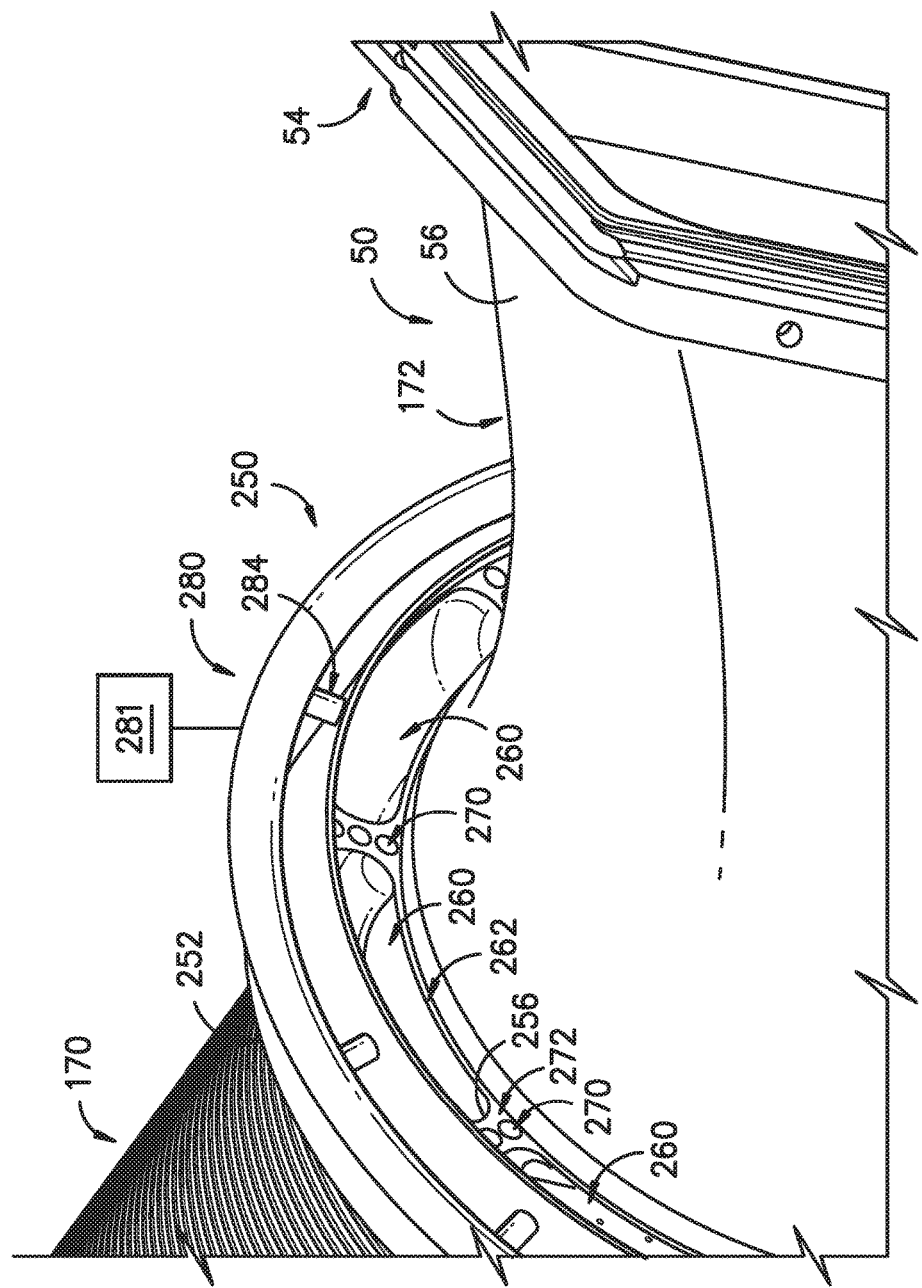
FIG. -12-

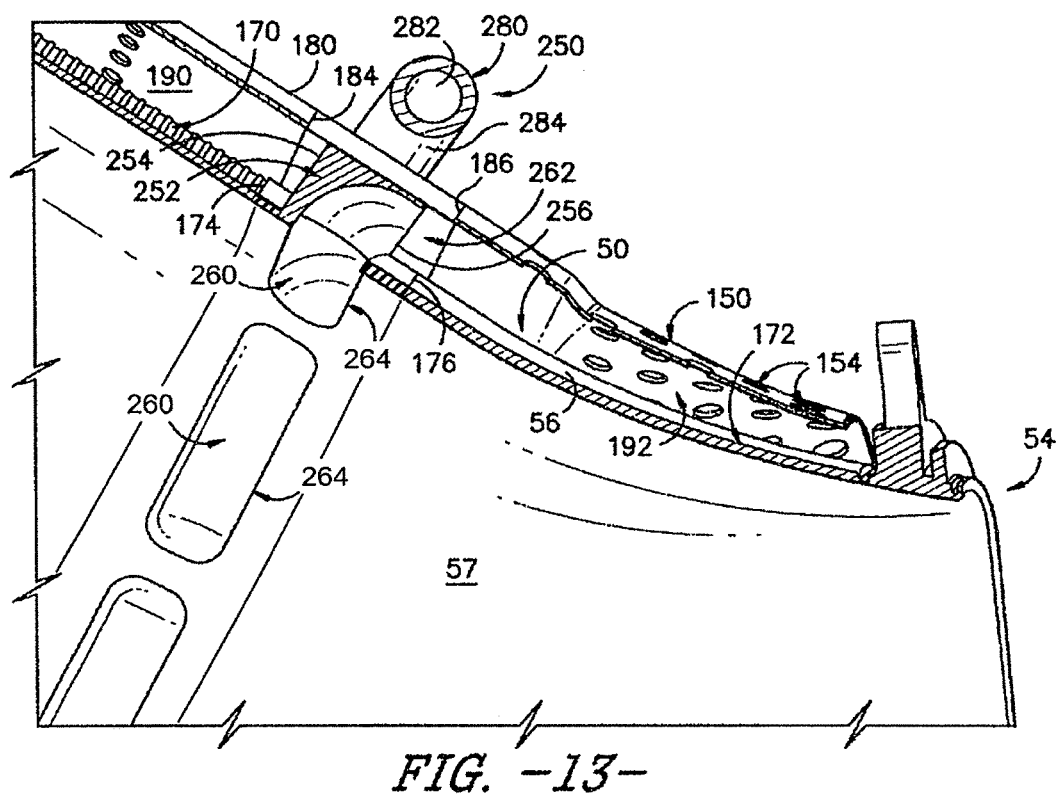
FIG. -13-

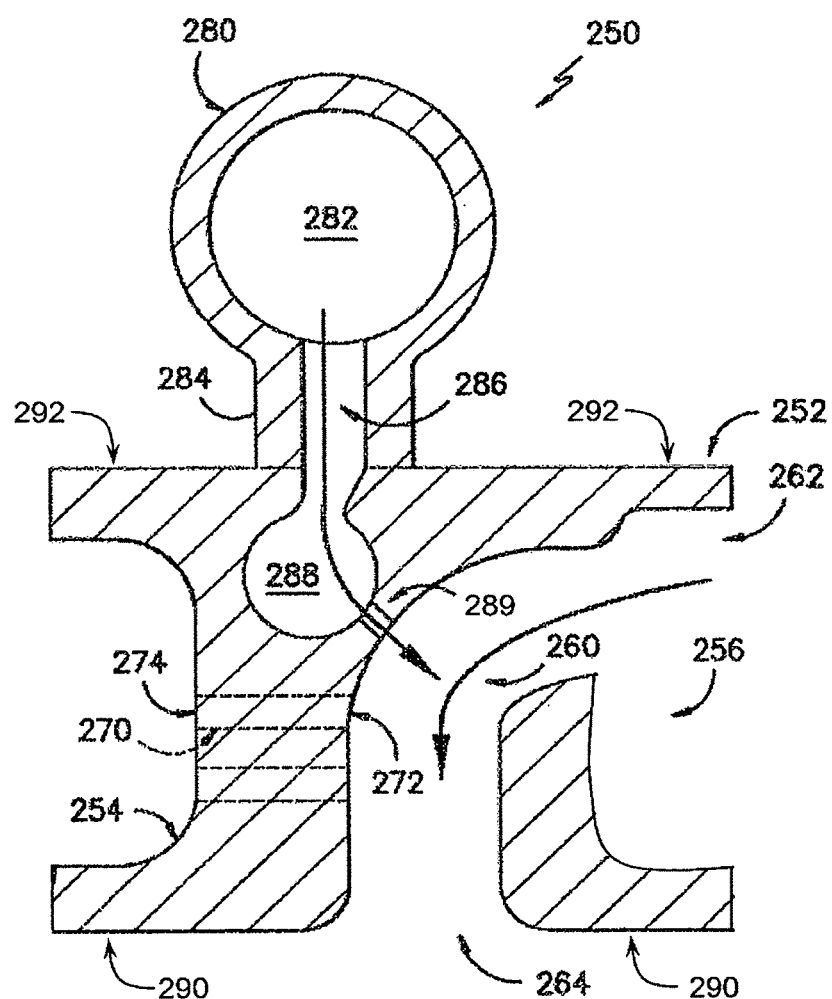
FIG. -14-

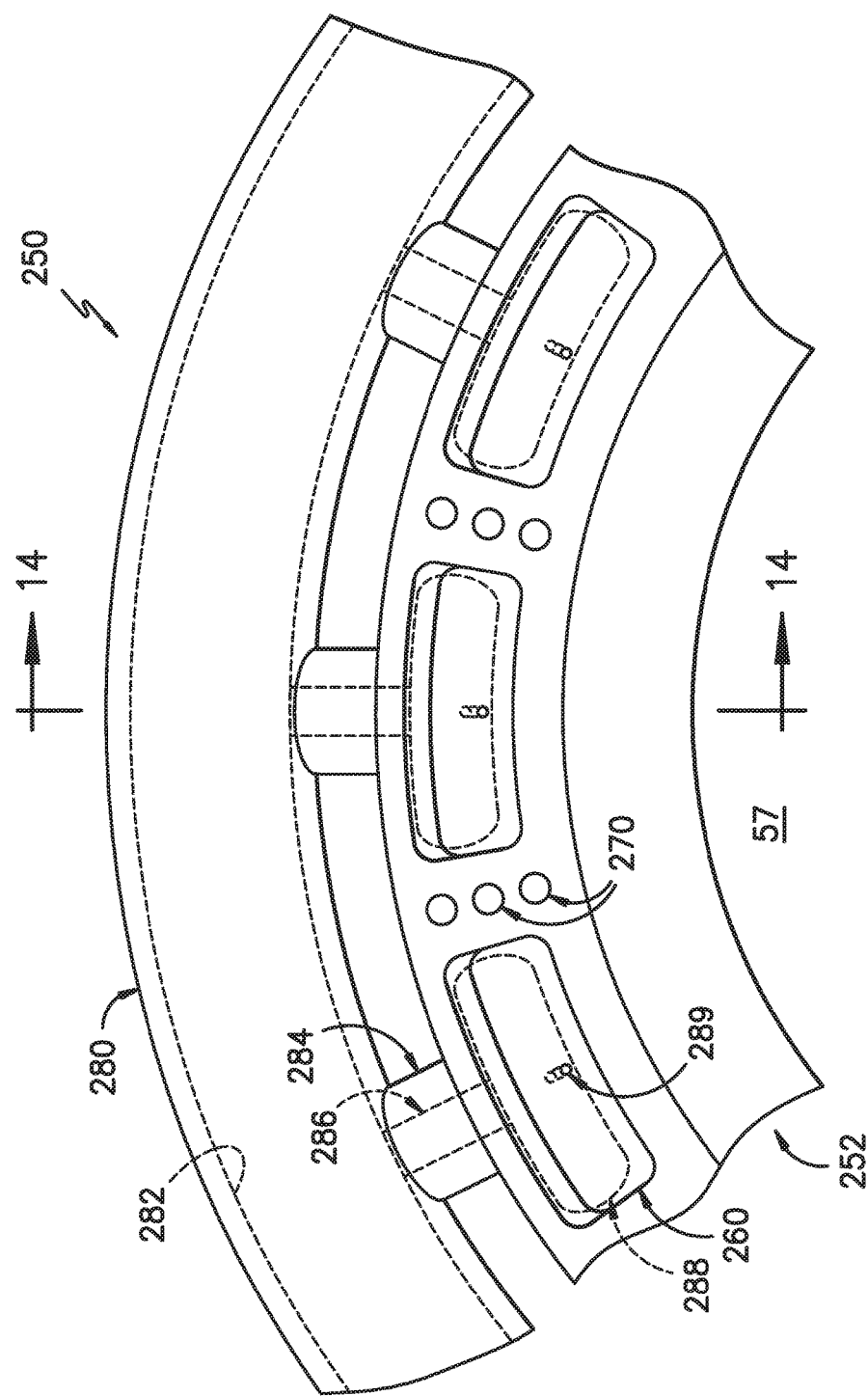

TRANSITION DUCT ASSEMBLY WITH LATE INJECTION FEATURES

FIELD OF THE DISCLOSURE

The subject matter disclosed herein relates generally to turbomachines, and more particularly to the use of transition ducts with late injection features in turbomachines.

BACKGROUND OF THE DISCLOSURE

Turbomachines are widely utilized in fields such as power generation. For example, a conventional gas turbine system includes a compressor section, a combustor section, and at least one turbine section. The compressor section is configured to compress air as the air flows through the compressor section. The air is then flowed from the compressor section to the combustor section, where it is mixed with fuel and combusted, generating a hot gas flow. The hot gas flow is provided to the turbine section, which utilizes the hot gas flow by extracting energy from it to power the compressor, an electrical generator, and other various loads.

The combustor sections of turbomachines generally include tubes or ducts for flowing the combusted hot gas therethrough to the turbine section or sections. Recently, combustor sections have been introduced which include tubes or ducts that shift the flow of the hot gas. For example, ducts for combustor sections have been introduced that, while flowing the hot gas longitudinally therethrough, additionally shift the flow radially and/or tangentially such that the flow has various angular components. These designs have various advantages, including eliminating first stage nozzles from the turbine sections. The first stage nozzles were previously provided to shift the hot gas flow, and may not be required due to the design of these ducts. The elimination of first stage nozzles may eliminate associated pressure drops and increase the efficiency and power output of the turbomachine.

Various design and operating parameters influence the design and operation of combustor sections. For example, higher combustion gas temperatures generally improve the thermodynamic efficiency of the combustor section. However, higher combustion gas temperatures also promote flashback and/or flame holding conditions in which the combustion flame migrates towards the fuel being supplied by fuel nozzles, possibly causing severe damage to the fuel nozzles in a relatively short amount of time. In addition, higher combustion gas temperatures generally increase the disassociation rate of diatomic nitrogen, increasing the production of nitrogen oxides (NOX). Conversely, a lower combustion gas temperature associated with reduced fuel flow and/or part load operation (turndown) generally reduces the chemical reaction rates of the combustion gases, increasing the production of carbon monoxide and unburned hydrocarbons. These design and operating parameters are of particular concern when utilizing ducts that shift the flow of the hot gas therein, as discussed above.

BRIEF DESCRIPTION OF THE DISCLOSURE

Aspects and advantages of the disclosure will be set forth in part in the following description, or may be obvious from the description, or may be learned through practice of the disclosure.

In one embodiment, a turbomachine is provided. The turbomachine includes a plurality of transition ducts disposed in a generally annular array, each of the plurality of transition ducts including an inlet, an outlet, and a passage defining an interior and extending between the inlet and the outlet and defining a longitudinal axis, a radial axis, and a tangential axis. The outlet of each of the plurality of transition ducts is offset from the inlet along the longitudinal axis and the tangential axis. Each of the plurality of transition ducts further includes an upstream portion and a downstream portion. The upstream portion extends between the inlet and an aft end, and the downstream portion extends between a head end and the outlet. The turbomachine further includes a late injection assembly disposed between the upstream portion and the downstream portion of a transition duct of the plurality of transition ducts. The late injection assembly provides fluid communication for an injection fluid to flow into the interior downstream of the inlet of the transition duct. The late injection assembly includes a late injection ring, the late injection ring defining a main conduit, the main conduit extending between an inlet and an outlet. The inlet is defined in a downstream side of the late injection ring for accepting working fluid for mixing with fuel within the late injection ring. The outlet is in fluid communication with the interior of the transition duct.

In another embodiment, a turbomachine is provided. The turbomachine includes a plurality of transition ducts disposed in a generally annular array, each of the plurality of transition ducts including an inlet, an outlet, and a passage defining an interior and extending between the inlet and the outlet and defining a longitudinal axis, a radial axis, and a tangential axis. The outlet of each of the plurality of transition ducts is offset from the inlet along the longitudinal axis and the tangential axis. Each of the plurality of transition ducts further includes an upstream portion and a downstream portion. The upstream portion extends between the inlet and an aft end, and the downstream portion extends between a head end and the outlet. The turbomachine further includes a flow sleeve generally surrounding the transition duct. The flow sleeve includes an inlet, an outlet, and a sleeve passage extending between the inlet and the outlet. The flow sleeve further includes an upstream portion and a downstream portion. The upstream portion extends between the inlet and an aft end, and the downstream portion extends between a head end and the outlet. The upstream portions of the transition duct and the flow sleeve define an upstream cavity therebetween, and the downstream portions of the transition duct and the flow sleeve define a downstream cavity therebetween. The turbomachine further includes a late injection assembly disposed between the upstream portion and the downstream portion of a transition duct of the plurality of transition ducts. The late injection assembly provides fluid communication for an injection fluid to flow into the interior downstream of the inlet of the transition duct. The late injection assembly includes a late injection ring. The late injection ring defines a main conduit, the main conduit extending between an inlet and an outlet, the inlet defined in a downstream side of the late injection ring and in fluid communication with the downstream cavity for accepting working fluid for mixing with fuel within the late injection ring, the outlet in fluid communication with the interior of the transition duct. The late injection assembly further includes a fuel manifold, the fuel manifold in fluid communication with a fuel source for flowing fuel to the fuel manifold and in fluid communication with the main conduit for flowing fuel to the main conduit. The fuel manifold defines a manifold conduit and the late injection ring defines a fuel plenum. Fuel flows from the fuel manifold to the fuel plenum and from the fuel plenum to the main conduit and mixes with working fluid in the main conduit.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 1 is a schematic view of a gas turbine system according to embodiments of the present disclosure;

FIG. 2 is a cross-sectional view of several portions of a gas turbine system according to embodiments of the present disclosure;

FIG. 3 is a cross-sectional view of a turbine section of a gas turbine system according to embodiments of the present disclosure.

FIG. 4 is a perspective view of an annular array of transition ducts according to embodiments of the present disclosure;

FIG. 5 is a top perspective view of a plurality of transition ducts and associated impingement sleeves according to embodiments of the present disclosure;

FIG. 6 is a side perspective view of a transition duct according to embodiments of the present disclosure;

FIG. 7 is a cutaway perspective view of a transition duct assembly, including neighboring transition ducts and forming various portions of an airfoil therebetween according to embodiments of the present disclosure;

FIG. 8 is a top front perspective view of a plurality of transition ducts and associated impingement sleeves according to embodiments of the present disclosure;

FIG. 9 is a top rear perspective view of a plurality of transition ducts connected to a support ring assembly according to embodiments of the present disclosure;

FIG. 10 is a side perspective view of a downstream portion of a transition duct according to embodiments of the present disclosure;

FIG. 11 is a perspective view of a downstream portion of the transition duct of FIG. 10, as viewed from the downstream end of the downstream portion, according to embodiments of the present disclosure;

FIG. 12 is a perspective view of a late injection assembly connected between upstream and downstream portions of a transition duct according to embodiments of the present disclosure;

FIG. 13 is a side cross-sectional view of a late injection assembly connected between upstream and downstream portions of a transition duct and associated impingement sleeve according to embodiments of the present disclosure;

FIG. 14 is a side cross-sectional view of a late injection assembly according to embodiments of the present disclosure; and FIG. 15 is a front cross-sectional view of a late injection assembly connected to a transition duct according to embodiments of the present disclosure.

DETAILED DESCRIPTION OF THE DISCLOSURE

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

FIG. 1 is a schematic diagram of a turbomachine, which in the embodiment shown is a gas turbine system 10. It should be understood that the turbomachine of the present disclosure need not be a gas turbine system 10, but rather may be any suitable turbine system or other turbomachine, such as a steam turbine system or other suitable system. The system 10 as shown may include a compressor section 12, a combustor section 14 which may include a plurality of combustors 15 as discussed below, and a turbine section 16. The compressor section 12 and turbine section 16 may be coupled by a shaft 18. The shaft 18 may be a single shaft or a plurality of shaft segments coupled together to form shaft 18. The shaft 18 may further be coupled to a generator or other suitable energy storage device, or may be connected directly to, for example, an electrical grid. An inlet section 19 may provide an air flow to the compressor section 12, and exhaust gases may be exhausted from the turbine section 16 through an exhaust section 20 and exhausted and/or utilized in the system 10 or other suitable system. Exhaust gases from the system 10 may for example be exhausted into the atmosphere, flowed to a steam turbine or other suitable system, or recycled through a heat recovery steam generator.

Referring to FIG. 2, a simplified drawing of several portions of a gas turbine system 10 is illustrated. The gas turbine system 10 as shown in FIG. 2 includes a compressor section 12 for pressurizing a working fluid, discussed below, that is flowing through the system 10. Pressurized working fluid discharged from the compressor section 12 flows into a combustor section 14, which may include a plurality of combustors 15 (only one of which is illustrated in FIG. 2) disposed in an annular array about an axis of the system 10. The working fluid entering the combustor section 14 is mixed with fuel, such as natural gas or another suitable liquid or gas, and combusted. Hot gases of combustion flow from each combustor 15 to a turbine section 16 to drive the system 10 and generate power.

A combustor 15 in the gas turbine 10 may include a variety of components for mixing and combusting the working fluid and fuel. For example, the combustor 15 may include a casing 21, such as a compressor discharge casing 21. A variety of sleeves, which may be axially extending annular sleeves, may be at least partially disposed in the casing 21. The sleeves, as shown in FIG. 2, extend axially along a generally longitudinal axis 98, such that the inlet of a sleeve is axially aligned with the outlet. For example, a combustor liner 22 may generally define a combustion zone 24 therein. Combustion of the working fluid, fuel, and optional oxidizer may generally occur in the combustion zone 24. The resulting hot gases of combustion may flow generally axially along the longitudinal axis 98 downstream through the combustion liner 22 into a transition piece 26, and then flow generally axially along the longitudinal axis 98 through the transition piece 26 and into the turbine section 16.

The combustor 15 may further include a fuel nozzle 40 or a plurality of fuel nozzles 40. Fuel may be supplied to the fuel nozzles 40 by one or more manifolds (not shown). As discussed below, the fuel nozzle 40 or fuel nozzles 40 may supply the fuel and, optionally, working fluid to the combustion zone 24 for combustion.

Referring now to FIGS. 4 through 15, a combustor 15 according to the present disclosure may include a transition duct 50, generally referred to as a transition duct assembly. The transition ducts 50 of the present disclosure may be provided in place of various axially extending sleeves of other combustors. For example, a transition duct 50 may replace the axially extending transition piece 26 and, optionally, the combustor liner 22 of a combustor 15. Thus, the transition duct may extend from the fuel nozzles 40, or from the combustor liner 22. As discussed herein, the transition duct 50 may provide various advantages over the axially extending combustor liners 22 and transition pieces 26 for flowing working fluid therethrough and to the turbine section 16.

As shown, the plurality of transition ducts 50 may be disposed in an annular array about a longitudinal axis 90. Further, each transition duct 50 may extend between a fuel nozzle 40 or plurality of fuel nozzles 40 and the turbine section 16. For example, each transition duct 50 may extend from the fuel nozzles 40 to the turbine section 16. Thus, working fluid may flow generally from the fuel nozzles 40 through the transition duct 50 to the turbine section 16. In some embodiments, the transition ducts 50 may advantageously allow for the elimination of the first stage nozzles in the turbine section, which may eliminate any associated drag and pressure drop and increase the efficiency and output of the system 10.

Each transition duct 50 may have an inlet 52, an outlet 54, and a passage 56 therebetween which may define an interior 57. The inlet 52 and outlet 54 of a transition duct 50 may have generally circular or oval cross-sections, rectangular cross-sections, triangular cross-sections, or any other suitable polygonal cross-sections. Further, it should be understood that the inlet 52 and outlet 54 of a transition duct 50 need not have similarly shaped cross-sections. For example, in one embodiment, the inlet 52 may have a generally circular cross-section, while the outlet 54 may have a generally rectangular cross-section.

Further, the passage 56 may be generally tapered between the inlet 52 and the outlet 54. For example, in an exemplary embodiment, at least a portion of the passage 56 may be generally conically shaped. Additionally or alternatively, however, the passage 56 or any portion thereof may have a generally rectangular cross-section, triangular cross-section, or any other suitable polygonal cross-section. It should be understood that the cross-sectional shape of the passage 56 may change throughout the passage 56 or any portion thereof as the passage 56 tapers from the relatively larger inlet 52 to the relatively smaller outlet 54.

The outlet 54 of each of the plurality of transition ducts 50 may be offset from the inlet 52 of the respective transition duct 50. The term "offset", as used herein, means spaced from along the identified coordinate direction. The outlet 54 of each of the plurality of transition ducts 50 may be longitudinally offset from the inlet 52 of the respective transition duct 50, such as offset along the longitudinal axis 90.

Additionally, in exemplary embodiments, the outlet 54 of each of the plurality of transition ducts 50 may be tangentially offset from the inlet 52 of the respective transition duct 50, such as offset along a tangential axis 92. Because the outlet 54 of each of the plurality of transition ducts 50 is tangentially offset from the inlet 52 of the respective transition duct 50, the transition ducts 50 may advantageously utilize the tangential component of the flow of working fluid through the transition ducts 50 to eliminate the need for first stage nozzles in the turbine section 16, as discussed below.

Further, in exemplary embodiments, the outlet 54 of each of the plurality of transition ducts 50 may be radially offset from the inlet 52 of the respective transition duct 50, such as offset along a radial axis 94. Because the outlet 54 of each of the plurality of transition ducts 50 is radially offset from the inlet 52 of the respective transition duct 50, the transition ducts 50 may advantageously utilize the radial component of the flow of working fluid through the transition ducts 50 to further eliminate the need for first stage nozzles in the turbine section 16, as discussed below.

It should be understood that the tangential axis 92 and the radial axis 94 are defined individually for each transition duct 50 with respect to the circumference defined by the annular array of transition ducts 50, as shown in FIG. 4, and that the axes 92 and 94 vary for each transition duct 50 about the circumference based on the number of transition ducts 50 disposed in an annular array about the longitudinal axis 90.

As discussed, after hot gases of combustion are flowed through the transition duct 50, they may be flowed from the transition duct 50 into the turbine section 16. As shown in FIG. 3, a turbine section 16 according to the present disclosure may include a shroud 102, which may define a hot gas path 104. The shroud 102 may be formed from a plurality of shroud blocks. The shroud blocks may be disposed in one or more annular arrays, each of which may define a portion of the hot gas path 104 therein. Turbine section 16 may additionally include a support ring assembly, which may include a lower support ring 180 and an upper support ring 182 and which may for example be positioned upstream (along the hot gas path 104) of the shroud 102 (such as the first plurality of shroud blocks thereof) or may be a first portion of the shroud 102. The support ring assembly may further define the hot gas path 104 (i.e. between the lower and upper support rings 180, 182), and provides the transition between the transition ducts 50 and the turbine section 16. Accordingly, the support ring assembly (and rings 180, 182 thereof) may be downstream (along the hot gas path 104) of the plurality of transition ducts 50. Hot gas may flow from the transition ducts 50 into and through the support ring assembly (between the support rings 180, 182), and from the support ring assembly through the remainder of the turbine section 16. It should be noted that the support rings may be conventionally referred to nozzle support rings or first stage nozzle support rings. However, as discussed herein, no first stage nozzles may be utilized with transition ducts 50 in accordance with exemplary embodiments of the present disclosure, and thus the support rings in exemplary embodiments do not surround any first stage or other nozzles.

The turbine section 16 may further include a plurality of buckets 112 and a plurality of nozzles 114. Each of the plurality of buckets 112 and nozzles 114 may be at least partially disposed in the hot gas path 104. Further, the plurality of buckets 112 and the plurality of nozzles 114 may be disposed in one or more annular arrays, each of which may define a portion of the hot gas path 104.

The turbine section 16 may include a plurality of turbine stages. Each stage may include a plurality of buckets 112 disposed in an annular array and a plurality of nozzles 114 disposed in an annular array. For example, in one embodiment, the turbine section 16 may have three stages, as shown in FIG. 3. For example, a first stage of the turbine section 16 may include a first stage nozzle assembly (not shown) and a first stage buckets assembly 122. The nozzles assembly may include a plurality of nozzles 114 disposed and fixed circumferentially about the shaft 18. The bucket assembly 122 may include a plurality of buckets 112 disposed circumferentially about the shaft 18 and coupled to the shaft 18. In exemplary embodiments wherein the turbine section is coupled to combustor section 14 including a plurality of transition ducts 50, however, the first stage nozzle assembly may be eliminated, such that no nozzles are disposed upstream of the first stage bucket assembly 122. Upstream may be defined relative to the flow of hot gases of combustion through the hot gas path 104.

A second stage of the turbine section 16 may include a second stage nozzle assembly 123 and a second stage buckets assembly 124. The nozzles 114 included in the nozzle assembly 123 may be disposed and fixed circumferentially about the shaft 18. The buckets 112 included in the bucket assembly 124 may be disposed circumferentially about the shaft 18 and coupled to the shaft 18. The second stage nozzle assembly 123 is thus positioned between the first stage bucket assembly 122 and second stage bucket assembly 124 along the hot gas path 104. A third stage of the turbine section 16 may include a third stage nozzle assembly 125 and a third stage bucket assembly 126. The nozzles 114 included in the nozzle assembly 125 may be disposed and fixed circumferentially about the shaft 18. The buckets 112 included in the bucket assembly 126 may be disposed circumferentially about the shaft 18 and coupled to the shaft 18. The third stage nozzle assembly 125 is thus positioned between the second stage bucket assembly 124 and third stage bucket assembly 126 along the hot gas path 104.

It should be understood that the turbine section 16 is not limited to three stages, but rather that any number of stages are within the scope and spirit of the present disclosure.

Each transition duct 50 may interface with one or more adjacent transition ducts 50. For example, FIGS. 5 through 15 illustrate embodiments of a first transition duct 130 and a second transition duct 132 of the plurality of transition ducts 50. These neighboring transition ducts 130, 132 may include contact faces 134, which may be outer surfaces included in the outlets of the transition duct 50. The contact faces 134 may contact associated contact faces 134 of adjacent neighboring transition ducts 50 and/or the support ring assembly (and support rings 200, 202 thereof), as shown, to provide an interface between the transition ducts 50 and/or between the transition ducts 50 and the support ring assembly. For example, contact faces 134 of the first and second transition ducts 130, 132 may, as shown, contact each other and provide an interface between the first and second transition ducts 130, 132. Further, contact faces 134 of the first and second transition ducts 130, 132 may, as shown, contact the support ring assembly and provide an interface between the transition ducts 130, 132 and the support ring assembly. As discussed herein, seals may be provided between the various contact faces to facilitate sealing at such interfaces. Notably, contact as discussed herein may include direct contact between the components themselves or indirect component through seals disposed between the components.

Further, the transition ducts 50, such as the first and second transition ducts 130, 132, may form aerodynamic structures 140 having various aerodynamic surface of an airfoil. Such aerodynamic structure 140 may, for example, be defined by inner surfaces of the passages 56 of the transition ducts 50, and further may be formed when contact faces 134 of adjacent transition ducts 50 interface with each other. These various surfaces may shift the hot gas flow in the transition ducts 50, and thus eliminate the need for first stage nozzles, as discussed herein. For example, in some embodiments as illustrated in FIGS. 7 and 8, an inner surface of a passage 56 of a transition duct 50, such as a first transition duct 130, may define a pressure side 142, while an opposing inner surface of a passage 56 of an adjacent transition duct 50, such as a second transition duct 132, may define a suction side 144. When the adjacent transition ducts 50, such as the contact faces 134 thereof, interface with each other, the pressure side 142 and suction side 144 may combine to define a trailing edge 146. In other embodiments, as illustrated in FIG. 11, inner surfaces of a passage 56 of a transition duct 50, such as a first transition duct 130, may define a pressure side 142 and a suction side 144 as well as a trailing edge therebetween. Inner surfaces of a passage 56 of a neighboring transition duct 50, such as a second transition duct 132, may further define the pressure side 142 and/or the suction side 144.

As shown in FIGS. 5 and 8, in exemplary embodiments, flow sleeves 150 may circumferentially surround at least a portion of the transition ducts 50. A flow sleeve 150 circumferentially surrounding a transition duct 50 may define an annular passage 152 therebetween. Compressed working fluid from the casing 21 may flow through the annular passage 152 to provide convective cooling transition duct 50 before reversing direction to flow through the fuel nozzles 40 and into the transition duct 50. Further, in some embodiments, the flow sleeve 150 may be an impingement sleeve. In these embodiments, impingement holes 154 may be defined in the sleeve 150, as shown. Compressed working fluid from the casing 21 may flow through the impingement holes 154 and impinge on the transition duct 50 before flowing through the annular passage 152, thus providing additional impingement cooling of the transition duct.

Each flow sleeve 150 may have an inlet 162, an outlet 164, and a passage 166 therebetween. Each flow sleeve 150 may extend between a fuel nozzle 40 or plurality of fuel nozzles 40 and the turbine section 16, thus surrounding at least a portion of the associated transition duct 50. Thus, similar to the transition ducts 50, as discussed above, the outlet 164 of each of the plurality of flow sleeves 150 may be longitudinally, radially, and/or tangentially offset from the inlet 162 of the respective flow sleeve 150.

In some embodiments, as illustrated in FIGS. 5 and 8, a transition duct 50 according to the present disclosure is a single, unitary component extending between the inlet 52 and the outlet 54. In other embodiments, as illustrated in FIGS. 9 through 15, a transition duct 50 according to the present disclosure may include a plurality of sections or portions, which are articulated with respect to each other. This articulation of the transition duct 50 may allow the various portions of the transition duct 50 to move and shift relative to each other during operation, allowing for and accommodating thermal growth there. For example, a transition duct 50 may include an upstream portion 170 and a downstream portion 172. The upstream portion 170 may include the inlet 52 of the transition duct 50 and may extend generally downstream therefrom towards the outlet 54. The downstream portion 172 may include the outlet 54 of the transition duct 50 and may extend generally upstream therefrom towards the inlet 52. The upstream portion 170 may thus include and extend between the inlet 52 and an aft end 174, and the downstream portion 142 may include and extend between a head end 176 and the outlet 54.

Additionally, in some embodiments, as illustrated in FIGS. 5 and 8, a flow sleeve 150 may be a single, unitary component extending between the inlet 162 and the outlet

164. In other embodiments, as illustrated in FIGS. 9 through 15, a flow sleeve 150 according to the present disclosure may include a plurality of sections or portions. For example, a flow sleeve 150 may include an upstream portion 180 and a downstream portion 182. The upstream portion 180 may include the inlet 162 of the flow sleeve 150, and may extend generally downstream therefrom towards the outlet 164. The downstream portion 182 may include the outlet 164 of the flow sleeve 150, and may extend generally upstream therefrom towards the inlet 162. The upstream portion 180 may thus include and extend between the inlet 162 and an aft end 184, and the downstream portion 182 may include and extend between a head end 186 and the outlet 164. Accordingly, an upstream cavity 190 may be defined between the upstream portion 170 and the upstream portion 180, and a downstream cavity 192 may be defined between the downstream portion 172 and the downstream portion 182.

In some embodiments, use of an upstream portion 170 and downstream portion 172 can advantageously allow specific materials to be utilized for these portions. For example, the downstream portions 172 can advantageously be formed from ceramic materials, such as ceramic matrix composites. The upstream portions 170 and flow sleeves 150 can be formed from suitable metals. Use of ceramic materials is particularly advantageous due to their relatively higher temperature tolerances. Ceramic material can in particular be advantageously utilized for downstream portions 172 when the downstream portions 172 are connected to the support ring assembly (as discussed herein) and the upstream portions 170 can move relative to the downstream portions 172, as movement of the downstream portions 172 is minimized, thus lessening concerns about using relatively brittle ceramic materials.

In some embodiments, the interface between the transition ducts 50, such as the outlets 54 thereof, and the support ring assembly (and support rings 200, 202 thereof) may be a floating interface. For example, the outlets 54 may not be connected to the support ring assembly (and support rings 200, 202 thereof) and may be allowed to move relative to the support ring assembly. This may allow for thermal growth of the transition ducts 50 during operation. Suitable floating seals, which can accommodate such movement, may be disposed between the outlets 54 and the support ring assembly. Alternatively, and referring now to FIGS. 9 through 11, in some embodiments, the interface between the transition ducts 50, such as the outlets 54 thereof, and the support ring assembly (and support rings 200, 202 thereof) may be a connected interface.

For example, as illustrated, a plurality of mechanical fasteners 210 may be provided. The mechanical fasteners 210 may connect one or more of the transition ducts 50 (such as the outlets 54 thereof), including for example the first and/or second transition ducts 130, 132, to the support ring assembly (and support rings 200, 202 thereof). In exemplary embodiments as illustrated, a mechanical fastener 210 in accordance with the present disclosure includes a bolt, and may for example be a nut/bolt combination. In alternative embodiments, a mechanical fastener in accordance with the present disclosure may be or include a screw, nail, rivet, etc.

As illustrated mechanical fasteners 210 may extend through portions of the transition ducts 50 (such as the outlets 54 thereof) and support ring assembly (and support rings 200, 202 thereof) to connect these components together. The outlet 54 of a transition duct 50 may, for example, include an inner flange 212 and/or outer flange 214 (which may be/define contact faces 134 of the transition duct 50). The inner flange 212 may be disposed radially inward of the outer flange 214, and an opening of the outlet 54 through which hot gas flows from the transition duct 50 into and through the support ring assembly (between support rings 200 and 202) may be defined between the inner flange 212 and the outer flange 214. Bore holes 213, 215 may be defined in the inner 212 and outer flanges 214, respectively. The bore holes 213, 215 may align with bore holes defined in the lower support ring 200 and upper support ring 202, and mechanical fasteners 210 may extend through each bore hole 213, 215 and mating bore hole to connect the flange 212, 214 and support ring 200, 202 together.

Referring now to FIGS. 12 through 15, one or more late injection assemblies 250 may be provided. Late injection of injection fluid into the interior 57 may be provided through the late injection assemblies 250. In particular, each late injection assembly 210 may be in fluid communication with the interior 57 of an associated transition duct 50, and may thus provide fluid communication for the injection fluid to flow into the interior 57 downstream of the inlet(s) 52 of the associated transition duct 50.

The injection fluid may include fuel and, optionally, working fluid (i.e. air). In some embodiments, the injection fluid may be a lean mixture of fuel and working fluid, and may thus be provided as a late lean injection. In other embodiments, the injection fluid may be only fuel, without any working fluid, or may be another suitable mixture of fuel and working fluid.

A late injection assembly 250 (i.e. components thereof such as a late injection ring) is generally disposed between the upstream portion 170 and downstream portion 172 of an associated transition duct 50, and is further disposed between the upstream portion 180 and downstream portion 182 of an associated flow sleeve 150 that generally surrounds the late injection assembly 250. Assembly 250 may include, for example a late injection ring 252. The late injection ring 252 may be a generally annular (and thus ring-shaped) structure through which fuel and/or working fluid may flow, in which fuel and working fluid may mix to form an injection fluid, and from which injection fluid may flow into the interior 57 of an associated transition duct 50.

The ring 252 may be disposed between the upstream portion 170 and downstream portion 172 of an associated transition duct 50, and may further be disposed between the upstream portion 180 and downstream portion 182 of an associated flow sleeve 150 that generally surrounds the late injection assembly 250. Ring 252 may, for example, include an upstream side 254 which generally faces upstream portions 170, 180 (and cavity 190) and a downstream side 256 which generally faces downstream portions 172, 182 (and cavity 192).

The late injection ring 252 may, as shown, be connected to the aft ends 174, 184 and the head ends 176, 186. For example, upstream side 254 may be connected to the aft ends 174, 184, and downstream side 256 may be connected to the head ends 176, 186. Such connection(s) may be fixed connections, (i.e. welded, brazed, mechanically fastened, etc.) or articulated connections (i.e. via hula seals or other suitable seal-based connections). In exemplary embodiments, for example, at least one connection may be a fixed connection and at least one connection may be an articulated connection. For example, both aft end connections may be fixed and both head end connections may be articulated (or vice versa), or one head end connection may be articulated while the remainder of the connections are fixed, or one aft end connection may be articulated while the remainder of the connections are fixed.

The positioning of the late injection ring 252 between the upstream portion 170 and downstream portion 172 and between the upstream portion 180 and downstream portion 182 causes the late injection ring 252 to interrupt the flow of working fluid from the downstream cavity 192 to the upstream cavity 190. Instead, at least a portion of this working fluid (which has flowed into the downstream cavity 192 i.e. through the downstream portion 182 of the flow sleeve 150) may be flowed from the downstream cavity 192 into the late injection ring 252 for use in late injection as a component of the injection fluid.

For example, ring 252 may define one or more main conduits 260, each of which includes and extends between an inlet 262 and an outlet 264 and each of which is defined in the body of the fuel injection ring 252 that extends radially between an inner flange 290 and an outer flange 292. Compressed air or another suitable working fluid may flow into each main conduit 260 through the inlet 262 thereof. Injection fluid may flow from each conduit 260 through the outlet 264 thereof into the interior 57 of the associated transition duct 50. Accordingly, the inlet 262 may be defined in the downstream side 256 of the late injection ring 252 for accepting working fluid for mixing with fuel within the late injection ring 252 (i.e. within the main conduit 260 thereof). For example, the inlet 262 may, as shown, be in fluid communication with the downstream cavity 192, such that working fluid flows in axial direction from the downstream cavity 192 into the main conduit 260 through the inlet 262. The outlet 264 may be defined in the inner flange 290 of the late injection ring 252 (i.e. between the upstream and downstream sides 254, 256) which (along with passage 56) defines interior 57. Accordingly, the outlet 264 may be in fluid communication with the interior 57, such that working fluid flows from the main conduit 260 through the outlet 264 into the interior 57.

In exemplary embodiments, injection ring 252 may include a plurality of main conduits 260. The main conduits 260 may be spaced apart from each other, such as in a generally annular array as shown. In some embodiments, the main conduits 260 may be fluidly isolated from each other. Alternatively, the main conduits 260 may be in fluid communication (i.e. for pressure equalization purposes) via, for example, suitable bleed conduits defined in the injection ring 252 and extending therebetween.

In some embodiments, the injection ring 252 may fluidly isolate the downstream cavity 192 and upstream cavity 190 from each other. In these embodiments, all of the working fluid from downstream cavity 192 may flow into the main conduits 260 rather than the upstream cavity 190. Alternatively, however, a portion of the working fluid from downstream cavity 192 may be flowed through injection ring 252 to the upstream cavity 190 (i.e. for pressure equalization purposes, cooling purposes, etc.). For example, injection ring 252 may further define one or more bypass conduits 270, each of which may extend between an inlet 272 and an outlet 274. Inlets 272 may be defined in the downstream side 256, for accepting working fluid therein. Accordingly, inlets 272 may be in fluid communication with downstream cavity 192 such that working fluid flows from downstream cavity 192 into bypass conduits 270 through inlets 272. Outlets 274 may be defined in the upstream side 254, for exhausting working fluid therefrom. Accordingly, outlets 274 may be in fluid communication with upstream cavity 190 such that working fluid flows from bypass conduits 270 through outlets 274 into upstream cavity 190.

To provide fuel for mixing with working fluid to produce an injection fluid, i.e. within the injection ring 252, a late injection assembly 250 may further include a fuel manifold 280. The fuel manifold 280 may be in fuel communication with a fuel source 281 (i.e. via suitable passages, tubing, etc.) for flowing fuel to the fuel manifold 280. The fuel manifold 280 may further be in fluid communication with the injection ring 252, such as with each main conduit 260 thereof, for flowing fuel to the each main conduit 260.

Fuel manifold 280 may thus include a manifold conduit 282 through which fuel may flow. The fuel may be supplied to the manifold conduit 282 from the fuel source 281. In exemplary embodiments, the fuel manifold 280 is a generally annular (i.e. ring-shaped) component, and the manifold conduit 282 is an annular (i.e. ring-shaped) conduit. Accordingly, fuel can be distributed within the manifold conduit 282 to various peripheral locations about the transition duct 50, facilitating supply to the various main conduits 260 for mixing with working fluid.

The fuel manifold 280 may, as shown be a separate component from the injection ring 252 that may, for example, generally surround the injection ring 252. Struts 284 may, for example, extend between and support the fuel manifold 280 relative to the injection ring 252 and space the fuel manifold 280 from the injection ring 252.

To supply fuel from the fuel manifold 280 to the main conduits 260, one or more supply conduits 286 may be defined in the fuel manifold 280 (and within the injection ring 252 and/or struts 284). In some embodiments, each supply conduit 286 may extend between and be in fluid communication with the fuel manifold 280 and a main conduit 260. Alternatively, one or more fuel plenums 288 may be defined in the injection ring 252, and each supply conduit 286 may extend between and be in fluid communication with the fuel manifold 280 and a fuel plenum 288. For example, a plurality of fuel plenums 288 may be defined in the injection ring 252, and may be spaced apart in an annular array. In some embodiments, an individual fuel plenum 288 may be associated and in fluid communication with each main conduit 260. Alternatively, a fuel plenum 288 may be associated with and in fluid communication with more than one main conduit 260. Further, in some embodiments, the fuel plenums 288 may be fluidly isolated from each other, while in other embodiments, the fuel plenums 288 may be in fluid communication, i.e. via suitable bleed conduits, etc. Fuel may flow from the fuel manifold 280 through a supply conduit 286 to a fuel plenum 288.

Fuel in each fuel plenum 288 may further be flowed from the fuel plenum 288 to the associated main conduits 260, such as via injection conduits 289. Each injection conduit 289 may extend between and be in fluid communication with a fuel plenum 288 and main conduit 260. Accordingly, fuel may be flowed from a fuel plenum 288 through an injection conduit 289 to an associated main conduit 260, and may mix with working fluid in the main conduit 260 to form an injection fluid.

Use of late injection assemblies 250 in accordance with the present disclosure advantageously facilitates improved combustion while further facilitating improved support of the components thereof. In particular, the location and structure of the injection ring 252 allows for the late injection assembly 250 to be structurally sound and to be at least partially supported by other components of the turbomachine, such as the associated transition duct 50 and flow sleeve 150.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A turbomachine comprising:
  a plurality of transition ducts disposed in a generally annular array, each of the plurality of transition ducts comprising an inlet, an outlet, and a passage defining an interior and extending between the inlet and the outlet and defining a longitudinal axis, a radial axis, and a tangential axis, the outlet of each of the plurality of transition ducts offset from the inlet along the longitudinal axis and the tangential axis, each of the plurality of transition ducts further comprising an upstream portion and a downstream portion, the upstream portion extending between the inlet and an aft end, the downstream portion extending between a head end and the outlet; and
  a late injection assembly disposed between the upstream portion and the downstream portion of a first transition duct of the plurality of transition ducts, the late injection assembly comprising a late injection ring and an annular fuel manifold radially outward of and surrounding the late injection ring, the late injection ring comprising an inner flange an outer flange radially positioned between the inner flange and the annular fuel manifold and connected to the inner flange at least by circumferentially spaced partitions, and at least one main conduit defined between each adjacent pair of the spaced partitions, each of the at least one main conduit including and extending between a main conduit inlet oriented in an axial direction and a main conduit outlet defined radially through the inner flange, wherein the main conduit inlet is defined in a downstream side of the late injection ring for accepting working fluid for mixing with fuel within each of the at least one main conduit, and each of the main conduit outlet is in fluid communication with the interior of the first transition duct.

2. The turbomachine of claim 1, wherein the fuel manifold is in fluid communication with a fuel source for receiving the fuel from the fuel source and in fluid communication with each of at least one main conduit for flowing the fuel to each of the at least one main conduit.

3. The turbomachine of claim 2, wherein the fuel manifold defines a manifold conduit within the fuel manifold and the late injection ring defines a fuel plenum, and wherein the fuel flows from the manifold conduit of the fuel manifold to the fuel plenum and from the fuel plenum through one or more injection conduits to each of the at least one main conduit and mixes with working fluid in each of the at least one main conduit.

4. The turbomachine of claim 3, wherein the working fluid flowing into the main conduit enters the main conduit in an axial direction parallel to the longitudinal axis; and wherein the one or more injection conduits is disposed at an angle relative to the axial direction of flow of the working fluid as the working fluid enters the main conduit.

5. The turbomachine of claim 1, wherein at least one partition of the circumferentially spaced partitions of the late injection ring defines a bypass conduit, the bypass conduit extending between a bypass inlet defined in a downstream side of the late injection ring and a bypass outlet defined in an upstream side of the late injection ring.

6. The turbomachine of claim 1, further comprising a flow sleeve generally surrounding the first transition duct, the flow sleeve comprising an upstream portion extending between a flow sleeve inlet and a flow sleeve aft end, a downstream portion extending between a flow sleeve head end and a flow sleeve outlet, and a sleeve passage extending between the flow sleeve inlet and the flow sleeve outlet; and wherein the outer flange of the late injection ring is further disposed between the flow sleeve aft end of the upstream portion and the flow sleeve head end of the downstream portion of the flow sleeve.

7. The turbomachine of claim 6, wherein the outer flange of the late injection ring is connected to the flow sleeve aft end of the upstream portion of the flow sleeve and the flow sleeve head end of the downstream portion of the flow sleeve.

8. The turbomachine of claim 6, wherein the upstream portions of the first transition duct and the flow sleeve define an upstream cavity therebetween, and wherein the downstream portions of the first transition duct and the flow sleeve define a downstream cavity therebetween.

9. The turbomachine of claim 8, wherein the main conduit inlet of each of the at least one main conduit is in fluid communication with the downstream cavity.

10. The turbomachine of claim 6, wherein the flow sleeve is an impingement sleeve.

11. The turbomachine of claim 1, wherein the outlet of each of the plurality of transition ducts is further offset from the inlet of respective each of the plurality of transition ducts along the radial axis.

12. The turbomachine of claim 1, further comprising a turbine section in communication with the plurality of transition ducts, the turbine section comprising a first stage bucket assembly.

13. The turbine system of claim 12, wherein no nozzles are disposed upstream of the first stage bucket assembly.

14. A turbomachine comprising:
  a plurality of transition ducts disposed in a generally annular array, each of the plurality of transition ducts comprising an inlet, an outlet, and a passage defining an interior and extending between the inlet and the outlet and defining a longitudinal axis, a radial axis, and a tangential axis, the outlet of each of the plurality of transition ducts offset from the inlet along the longitudinal axis and the tangential axis, each of the plurality of transition ducts further comprising an upstream portion and a downstream portion, the upstream portion extending between the inlet and an aft end, the downstream portion extending between a head end and the outlet; wherein the plurality of transition ducts includes a first transition duct;
  a flow sleeve generally surrounding the first transition duct, the flow sleeve comprising an upstream portion extending between a flow sleeve inlet and a flow sleeve aft end, a downstream portion extending between a flow sleeve head end and a flow sleeve outlet, and a sleeve passage extending between the flow sleeve inlet and the flow sleeve outlet; wherein the upstream portion of the first transition duct and the upstream portion of the flow sleeve define an upstream cavity therebetween, and wherein the downstream portion of the first transition duct and the downstream portion of the flow sleeve define a downstream cavity therebetween; and
  a late injection assembly disposed between the upstream portion of the first transition duct and the upstream portion of the flow sleeve and the downstream portion of the first transition duct and the downstream portion of the flow sleeve, the late injection assembly comprising:

a late injection ring, the late injection ring comprising an inner flange, an outer flange radially positioned between the inner flange and an annular fuel manifold and connected to the inner flange at least by circumferentially spaced partitions, and at least one main conduit defined between each adjacent pair of the spaced partitions, each of the at least one main conduit including and extending between a main conduit inlet oriented in an axial direction and a main conduit outlet defined radially through the inner flange, the main conduit inlet defined in a downstream side of the late injection ring and in fluid communication with the downstream cavity for accepting working fluid for mixing with fuel within each of the at least one main conduit, each main conduit outlet in fluid communication with the interior of the first transition duct; and the fuel manifold radially outward of and surrounding the late injection ring, the fuel manifold being in fluid communication with a fuel source for receiving the fuel from the fuel source and in fluid communication with the at least one main conduit for flowing the fuel to each of the at least one main conduit, wherein the fuel manifold defines a manifold conduit within the fuel manifold and the late injection ring defines a fuel plenum, and wherein the fuel flows from the manifold conduit of the fuel manifold to the fuel plenum and from the fuel plenum through one or more injection conduits to each of the at least one main conduit and mixes with working fluid in each of the at least one main conduit.

15. The turbomachine of claim 14, wherein at least one partition of the circumferentially spaced partitions of the late injection ring defines a bypass conduit, the bypass conduit extending between a bypass inlet defined in a downstream side of the late injection ring and a bypass outlet defined in an upstream side of the late injection ring.

16. The turbomachine of claim 14, wherein the inner flange of the late injection ring is connected to the aft end of the upstream portion and the head end of the downstream portion of the first transition duct; and wherein the outer flange of the late injection ring is connected to the flow sleeve aft end of the upstream portion of the flow sleeve and the flow sleeve head end of the downstream portion of the flow sleeve.

17. The turbomachine of claim 14, wherein the flow sleeve is an impingement sleeve.

18. The turbomachine of claim 14, further comprising a turbine section in communication with the plurality of transition ducts, the turbine section comprising a first stage bucket assembly, and wherein no nozzles are disposed upstream of the first stage bucket assembly.

19. The turbomachine of claim 14, wherein the working fluid flowing into the main conduit enters the main conduit in an axial direction parallel to the longitudinal axis; and wherein the one or more injection conduits is disposed at an angle relative to the axial direction of flow of the working fluid as the working fluid enters the main conduit.

* * * * *